United States Patent

[11] 3,597,700

[72] Inventor Auguste Louis Marie Antoine Rouy
142 Edgemont Road, Scarsdale, N.Y. 10583
[21] Appl No. 755,516
[22] Filed Aug. 22, 1968
[45] Patented Aug. 3, 1971
Continuation of application Ser. No. 289,626, June 21, 1963, now abandoned.

[54] HIGH ENERGY GAS LASER PRODUCING A CONTINUOUS ABNORMAL GLOW DISCHARGE IN THE GAS MIXTURE
5 Claims, 14 Drawing Figs.

[52] U.S. Cl. ................................................ 331/94.5
[51] Int. Cl. ................................................ H01s 3/09
[50] Field of Search ...................................... 331/94.5; 330/4.3

[56] References Cited
UNITED STATES PATENTS
| | | | |
|---|---|---|---|
| 3,248,548 | 4/1966 | Booth et al. | 331/94.5 |
| 3,311,843 | 3/1967 | Friedl | 331/94.5 |

OTHER REFERENCES
Patel, Optical Power Output in He-Ne and Pure Ne Maser. J. Applied Physics, Vol. 33, No. 11 (Nov. 1962) pp. 3194—3195

*Primary Examiner*—William L. Sikes
*Attorney*—Rudolph J. Jurick

ABSTRACT: An energizing coil encircles a tubular light-resonating cavity containing a gas mixture, the pressure of the gas mixture and the ratio of the cavity inside diameter to the coil diameter having predetermined values. A high frequency voltage is applied to the coil, the magnitude of the voltage being such as to produce and maintain an abnormal glow of the gas mixture substantially over the axial length of the coil.

PATENTED AUG 3 1971 3,597,700
SHEET 1 OF 4
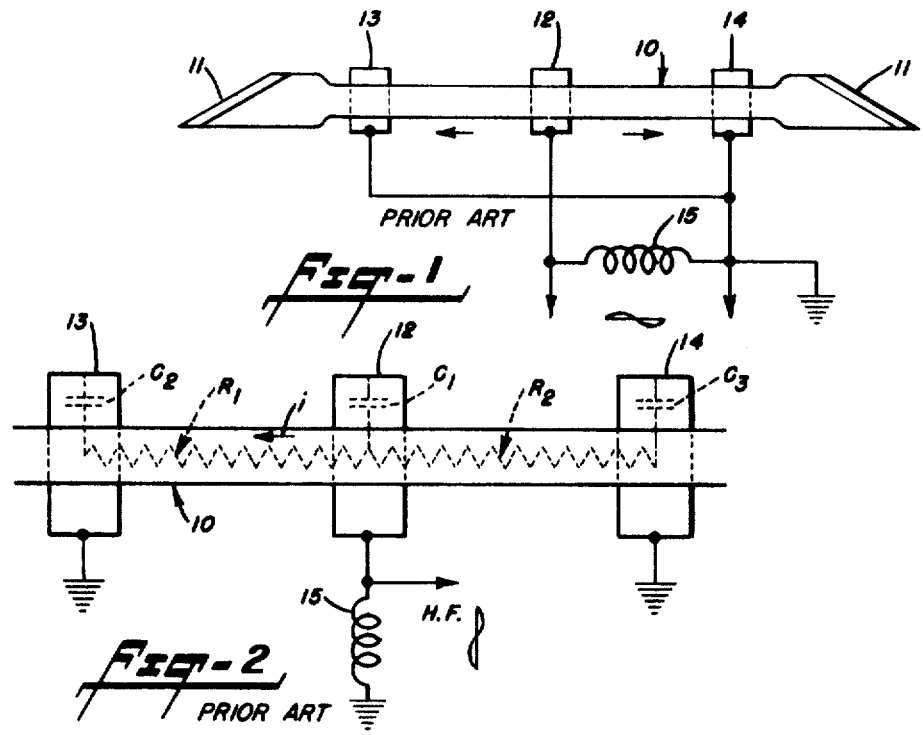
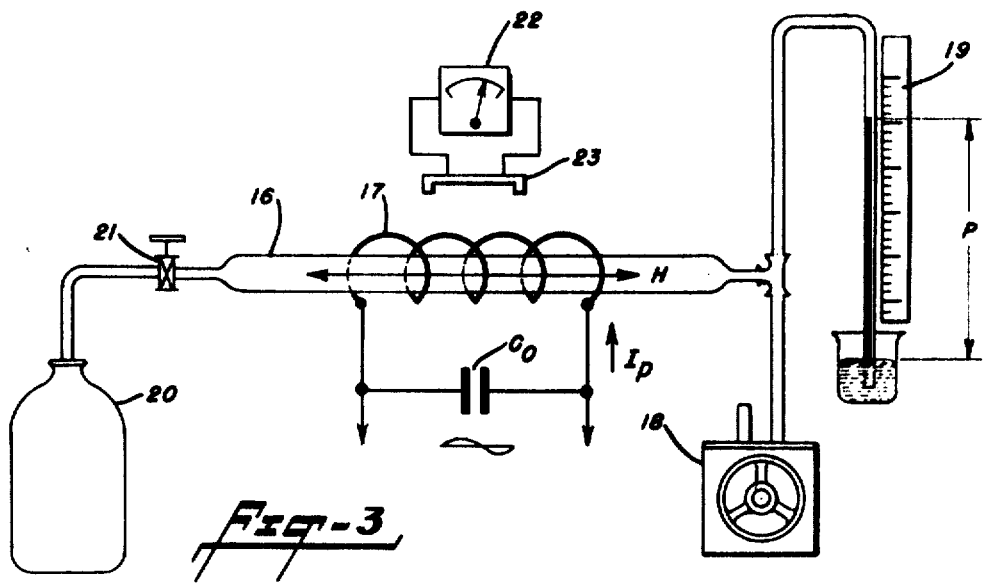
AUGUSTE LOUIS MARIE ANTOINE ROUY
INVENTOR.
BY
Rudolph J. Jurick
ATTORNEY

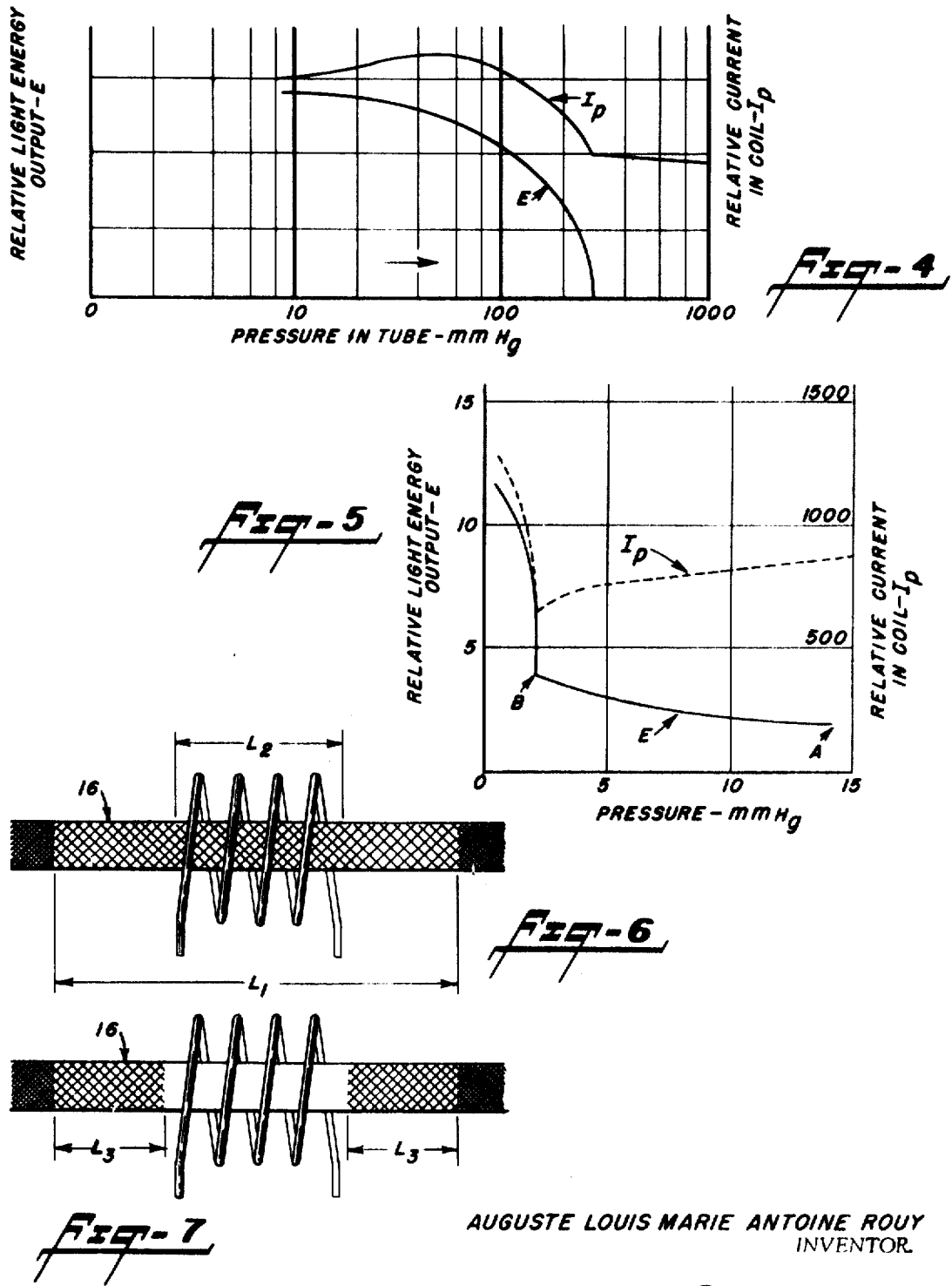

AUGUSTE LOUIS MARIE ANTOINE ROUY
INVENTOR.

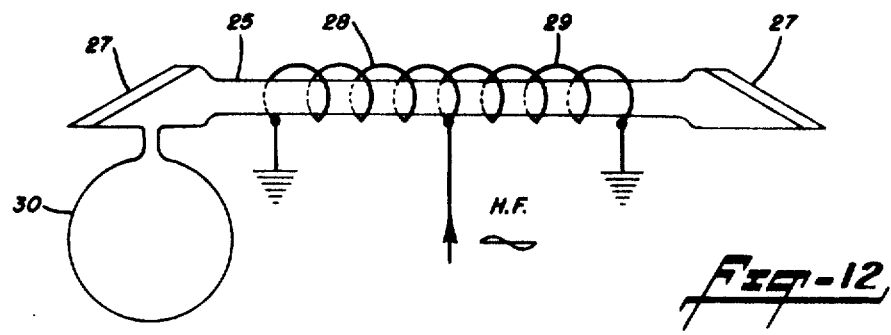
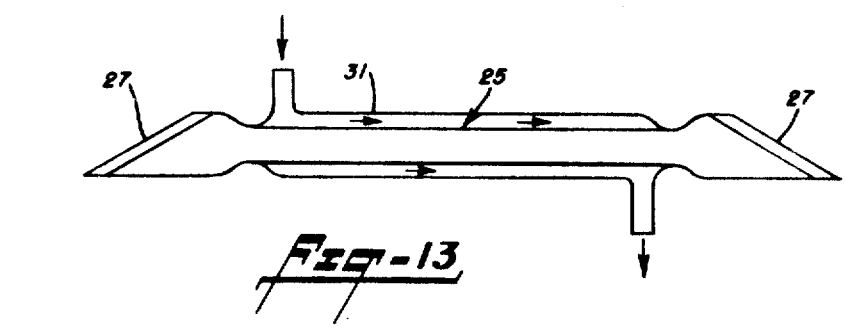
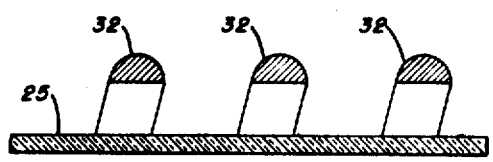
AUGUSTE LOUIS MARIE ANTOINE ROUY
INVENTOR.

HIGH ENERGY GAS LASER PRODUCING A CONTINUOUS ABNORMAL GLOW DISCHARGE IN THE GAS MIXTURE

This application is a continuation of my application Ser. No. 289,626, filed June 21, 1963, High Energy Gas Laser, now abandoned.

This invention relates to gas lasers and more particularly to a high-energy gas laser producing a continuous monochromatic light beam.

Basically, the functioning of a gas laser depends upon a sustained electrical discharge through a gaseous mixture containing ions and free electrons and maintained at a reduced pressure. Such mixtures generally are referred to as plasma.

Heretofore, the electrical discharge has been developed by means of spaced, capacitive electrodes encircling the plasma-containing vessel and connected to a suitable high-voltage, high frequency generator. Under the influence of the electrostatic field gradient, the gas becomes ionized at a steady energy level. The ionization current density, within the gas, is limited by the frequency and magnitude of the energizing voltage applied to the electrodes. In order to increase the ion density and the energy of the free electrons, it is necessary to increase both the magnitude and frequency of the energizing voltage. However, as soon as a certain ionization density is reached, the homogeneity of the discharge current distribution becomes very poor, as evidenced by the appearance of striae in the discharge glow.

Various other effects and limitations of the present electrostatic field arrangement preclude the possibility of obtaining a constant ion density throughout the plasma, which is a rigid requirement for a gas laser to operate properly, that is, to furnish a stable beam of monochromatic coherent light.

An object of this invention is the provision of a high-energy gas laser producing a continuous beam of monochromatic coherent light.

An object of this invention is the provision of a gas laser wherein the ion density is substantially constant throughout the plasma.

An object of this invention is the provision of a high-energy gas laser wherein the free electrons of the plasma are caused to move in helical paths.

An object of this invention is the provision of a high-energy gas laser wherein the gas mixture is subjected to the influence of both an electrostatic field and an electromagnetic field.

An object of this invention is the provision of a gas laser wherein the plasma is maintained at a predetermined pressure and subjected to electrostatic and electromagnetic field gradients.

An object of this invention is the provision of a high-energy gas laser wherein a gas mixture is maintained at a predetermined pressure within a tubular vessel, an energizing coil encircles the vessel, and a high-frequency voltage is applied to the coil, the frequency of the voltage being equal to the resonance frequency of the coil.

An object of this invention is the provision of a high-energy gas laser comprising a gas mixture contained within a closed tube having a predetermined volume, a chamber communicating with the tube and having a volume at least equal to that of the tube, and an electric coil surrounding the tube, said coil being energized by a high voltage having a frequency equal to the resonance frequency of the coil.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIG. 1 is a diagrammatic representation of a conventional gas laser utilizing an electrostatic field;

FIG. 2 is an equivalent electric circuit diagram of the arrangement shown in FIG. 1;

FIG. 3 illustrates an experimental arrangement for producing a high-energy gas laser in accordance with this invention;

FIG. 4 is a set of curves showing the variations in the current flowing in the tank coil and the light energy output with variations of the pressure in the tube;

FIG. 5 are similar curves within a pressure range of 1—14 millimeters of mercury;

FIGS. 6 and 7 illustrate pictorially the relative glow discharge intensity and the axial extent thereof when the gas pressure is, respectively, above and below 3 millimeters of mercury;

FIGS. 11, 12, 13 and 14 illustrate other embodiments of the invention.

Figure 8:
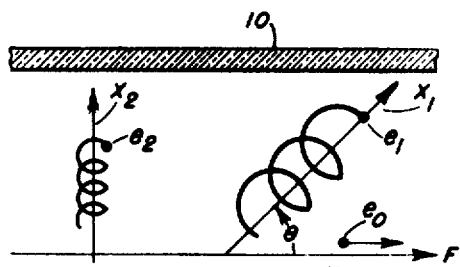
FIG. 8 is a representation of the electron paths under the influence of exciting fields.

Referring, now, to FIG. 1, a conventional gas laser comprises a tube 10, preferably made of quartz, terminated at each end by Brewster plates 11 which do not absorb polarized light rays whose amplitude direction is contained within the incidence plane of the rays unto the plane of the Brewster plates. Alternatively, the laser tube can be terminated by light-reflecting windows which reflect some 99.5 percent of the light, as is well known in the art. The tube is sealed and contains an appropriate gas mixture at a certain reduced pressure. External metallic electrodes 12, 13 and 14, in the form of closed rings or cylinders, are mounted coaxially of the tube. Being external to the tube, the electrodes cannot contaminate the gas mixture through metal evaporation under high-temperature, electric arc conditions. The two electrodes 13 and 14, located at the ends of the tube, generally are grounded while the center electrode 12 is connected to the high-voltage point of a high-frequency electrical current generator tank coil 15.

The equivalent electrical circuit of the FIG. 1 arrangement is shown in FIG. 2. Under the influence of the high-electrostatic field gradient surrounding the high-voltage electrode 12, the gas becomes ionized and conducts electrical current through the equivalent capacitances $C_1$, $C_2$, and $C_3$ existing between the respective electrodes 12, 13 and 14 and the conducting gas. The letters $R_1$ and $R_2$ represent the resistance of the conducting gas between the center electrode and each of the end electrodes. It will be apparent that when the gas has become ionized at a steady energy level, a current $i$ will flow in a circuit comprising the grounded tank coil 15, electrode 12, capacitance $C_1$, resistance $R_1$, capacitance $C_2$ and grounded electrode 13. An equal current will flow through the resistance $R_2$.

From experimental data, it has been found that the electrode-to-ionized gas capacitance ranges from 2 micromicrofarads to some 25 micromicrofarads, while the gas ohmic resistance falls in the order of magnitude of 100 ohms or less, depending upon the geometrical dimensions of the electrodes and the gas discharge configuration. Indeed, these values depend upon the tube diameter, the distance between the electrodes, the dimensions of the electrodes, the gas pressure and the ionization current density per unit volume in the gas plasma.

The ionization current density within the discharge plasma is a frequency-dependent function, as can readily be seen from the expression of the impedance scalars $Z$ of the circuit, $$Z = \left[ R^2 + \left( \frac{1}{\frac{C}{2} \times 2\pi f} \right)^2 \right]^{1/2} \quad (1)$$

$$= \left[ R^2 + \frac{1}{\pi^2 C^2 f^2} \right]^{1/2} \quad (2)$$

$$= \frac{1}{\pi C f} [1 + R^2 \pi^2 C^2 f^2]^{1/2} \quad (3)$$

where:

$R$ is the gas resistance between the electrodes, in ohms, $C$ is the capacity between the electrodes and the ionized gas, in farads, and $f$ is the frequency of the electrostatic voltage.

With frequencies of the order of 30 megacycles ($f=30\times10^6$) and the capacitance of the order of 10 micromicrofarads ($C=10\times10^{12}$), the impedance $Z$ becomes, $$Z = \frac{1}{3.14\times 10\times 10^{-12}\times 30\times 10^6}\left[1-R^2(\pi^2 C^2 f^2)\right]^{1/2} \quad (4)$$

$$= \frac{1}{9.42\times 10^{-4}}\left[1-R^2\,(9.42\cdot 10^{-4})^2\right]^{1/2} \quad (5)$$

$$= 1.06\times 10^3\left[1+\frac{R^2}{1.12\times 10^6}\right]^{1/2} \quad (6)$$

Obviously, the ohmic resistance $R$ can be neglected so that, essentially, the discharge current density is limited by the magnitude and frequency of the energizing voltage.

In order to increase the energy of the free electrons and the ionization density, it is necessary to increase both the magnitude and the frequency of the energizing voltage. However, as soon as a certain ionization density is reached, the homogeneity of the discharge current distribution becomes very poor, as evidenced by the appearance of striae in the discharge glow. This phenomenon can be demonstrated vividly by using a discharge tube having an inside diameter larger than 2 centimeters.

Under the present electrostatic mode for producing the gas discharge, considerable losses of the free electrons occur at the vessel walls and by charge cancellation effects. Free electrons, accelerated by the electrostatic field, are necessary to cause the elastic electron-atom collisions to raise the atom orbiting electrons to the proper energy levels. The free electrons also must enter into electron-atom inelastic collisions to form ions and to free more electrons to compensate for the electron losses, if the glow discharge is to be maintained. Elastic and inelastic collisions are governed by the electron mean free path, (a pressure-temperature depending function) and by the electron energy change between collisions (an electrostatic field gradient function).

Furthermore, under high-frequency electrostatic field excitation of the order of 30 megacycles, the mean trajectory amplitude of the free electron is rather large, precluding its confinement within a small volume of the plasma. Such mean trajectory amplitude of the electron can be reduced by increasing the frequency of the electric current, but this requires frequencies of the order of some 3,000 megacycles to achieve a radical change.

All in all, the system of gas discharge excitation by means of capacitive electrodes limits considerably the high-frequency input and, therefore, the light energy output. In consequence, such system cannot produce a constant ion density in the plasma, a rigid requirement for a gas laser to furnish a continuous beam of monochromatic, coherent light.

In order to confine the free electrons within a small volume and thereby decrease the losses to the walls of the vessel, I superimpose a magnetic field upon the electrostatic field. In this manner, the free electrons, being also influenced by the magnetic field, will follow a curved path instead of a linear path of excessive magnitude.

Reference, now, is made to FIG. 3, which shows an experimental arrangement forming a gas laser in accordance with this invention. Here, the quartz tube 16 is placed in the center of a high-frequency generator tank coil 17. One end of the tube is connected to a vacuum pump 18 and a mercury manometer 19. The other end of the tube is connected to a gas cylinder 20 through an adjustable, precision needle valve 21. With this arrangement, the gas pressure within the tube can be adjusted, at will, (by means of the needle valve) from atmospheric pressure down to values below 1 millimeter of mercury. The tube 16 has an inside diameter of 2.8 centimeters and the coil 17 comprises four turns having a diameter of 10.5 centimeters and an axial length of 10 centimeters. With 4,000 volts at a frequency of about 30 megacycles, applied across the coil, the vacuum pump was started and stable pressures obtained within the tube by adjustment of the needle valve 21. The gas pressure within the tube was progressively lowered until the gas discharge glow started. This occurred at approximately a pressure of 10 millimeters of mercury. The appearance and configuration of the discharge glow is exactly the same as the one obtained with the external capacitive electrodes. Apparently, the superimposition of the axial, high-frequency magnetic field H created by the current circulating in the coil 17, has no effect upon the discharge configuration or upon the ion density distribution. Moreover, the light energy output measured by means of a photocell 23 and meter 22, indicates no appreciable change in light energy output under the same parameters of high-frequency power input.

The pressure within the tube 16 then was increased slowly while maintaining the frequency and magnitude of the energizing voltage constant. With such slowly increasing pressure, there was noted first an increase and then a decrease in the current $I_p$ flowing in the tank coil 17. At the same time, the light energy output first decreased slowly and then more and more rapidly. When the pressure reached about 300 millimeters of mercury, the glow discharge disappeared. FIG. 4 illustrates the variation of the coil current $I_p$ and light energy output E as the pressure within the tube was increased slowly from 10 to 300 millimeters of mercury.

The experiment was repeated, that is, the pressure within the tube was reduced slowly until the glow discharge started, which again occurred at a pressure of about 10 millimeters of mercury. However, this time, instead of again increasing the pressure as in the first experiment, the pressure was further lowered by decrements of 1 millimeter of mercury. When the gas pressure within the tube was lowered to about 3 millimeters of mercury, and after a short lapse of time, an unexpected phenomenon took place. The current flowing in the tank coil increased asymptotically and the discharge glow became extremely brilliant within that volume of the quartz tube spanned by the coil. This condition is illustrated by the curves shown in FIG 5. Between the points A and B, (pressure range of 14 to 3 millimeters of mercury) the coil current $I_p$ decreases slowly while the light energy output E increases correspondingly. At about 3 millimeters of mercury, there is a vast increase in both coil current and light energy output. This sharp rise in the power input necessitated the immediate shutting down of the operation due to overloading of the high-frequency generator.

FIGS. 6 and 7 are pictorial representations to show, in a relative sense, the character of the glow discharge within the tube at different gas pressures. Specifically, FIG. 6 illustrates the discharge glow when the pressure within the tube 16 is above about 3 millimeters and below about 10 millimeters of mercury. It will be noted that the axial extent $L_1$ of the glow is substantially greater than the axial extent $L_2$ of the surrounding coil. Such glow is of substantially uniform intensity, as represented by the light, crossed lines. On the other hand, FIG. 7 illustrates the glow discharge when the above-described phenomenon takes place, that is, when the gas pressure is 3 millimeters of mercury or lower. In this case, the extremely intense portion of the glow is substantially coextensive with the axial length of the coil. The total axial extent of the glow is approximately the same as that shown in FIG 6 and those portions $L_3$ appearing beyond the coil end turns have approximately the same intensity as the FIG 6 glow, as represented by similar light, crossed lines. When compared against a dark background, the glow discharge represented within the distance $L_1$ in FIG. 6 and the distances $L_3$ in FIG. 7 appear very faint as compared to that appearing under the coil in FIG. 7.

The above experiment was performed again with means for limiting the power input to the energizing coil to the normal overload capacity of the high-frequency generator, thereby permitting a further reduction in the gas pressure within the tube. The generator was of the conventional dual, electron tube-type having a tunable load coil connected in the tube output circuits, such load coil being connected to the laser energizing coil by a coaxial cable. This permitted adjustment of the generator frequency to equal the resonance frequency of the energizing coil under load conditions. When the gas pressure was reduced to about 3 millimeters of mercury, the brilliant, abnormal glow discharge occurred within that tube portion spanned by the tank coil. The light energy output, as measured by the photocell and meter shown in FIG. 3, continued to increase sharply as the pressure was reduced to about 1 millimeter of mercury. Next, the gas pressure was increased slowly. The brilliant glow discharge continued as the pressure reached 3 millimeters of mercury, the starting pressure for the phenomenon and, in fact, continued substantially unattenuated until the gas pressure reached about 5.5 millimeters of mercury, at which point the abnormal glow discharge abruptly disappeared. Thus, the gas pressure at which the observed abnormal glow discharge terminated is about twice the starting pressure. As soon as the glow discharge subsided, the quartz tube had a light cherry red color indicative of a temperature of some 700—750° C.

The above experiment was repeated many times, using different tank coil configurations, that is, varying the number of coil turns, the axial coil length and the coil diameter. Even a single coil turn produced the same effect but, in that case, the brilliant zone of the glow discharge had a very short axial length. Quartz tubes of various diameters were also used with the same result, except for the power input requirement which follows a close linear relationship to the tube cross-sectional area. However, with a tank coil having a diameter of 10.5 centimeters, an axial length of 10 centimeters and formed of four turns of copper conductor, it was impossible to excite the abnormal glow discharge even at a pressure as low as 1.7 millimeters of mercury, when the inside diameter of the tube was smaller than 1.8 centimeters. Obviously, the diameter of the tank coil must decrease with decrease in tube diameter. Different gases and gas mixtures, specifically Helium, Kryton, Nitrogen and even air were tested and the observed behavior remained unchanged.

Examination of the radiated light energy, by means of a spectroscope, showed the presence of considerable emission lines when the gas is excited solely by an electrostatic field developed by means of the conventional external capacitive electrodes. Yet, lines of emission too faint to be observed under ordinary conditions become plainly visible when the extraordinary glow discharge is present. Moreover, the density of the glow, under the action of the high-frequency magnetic field superimposed over the electrostatic field, appeared to be of equal density throughout the emissive gas volume. No striae or ion concentrations could be observed even with a tube having an inside diameter as large as 7 centimeters. Furthermore, the extraordinary glow could not be brought about when a DC magnetic field was superimposed on the electrostatic field.

Without attempting to analyze, in detail, the physical mechanisms involved in the abnormal glow discharge which appears at reduced gas pressure when a high-frequency magnetic field is superimposed upon a high-frequency electrostatic field, one may draw some specific conclusions. The high-frequency magnetic field, lagging behind the electrostatic field by a given phase angle, entraps the free electrons within a limited plasma volume, forcing them to undergo many elastic and inelastic electron-atom collisions. There is a fundamental difference between the effects of a high-frequency magnetic field and a DC or steady, magnetic field. The intensity of a high-frequency magnetic field is a function of the instantaneous electrostatic field and varies with it. When a free electron is accelerated by a high-frequency electrostatic field, its acceleration varies with the instantaneous voltage gradient and so does its velocity. In the meantime, since the high-frequency magnetic field strength is a function of the electrostatic field, the electron is effected by a force normal to its instantaneous trajectory and approximately proportional to the square of the electrostatic field gradient. The net result of the combined high-frequency fields, electromagnetic and electrostatic, results in a constant radius trajectory for the free electron. Contrariwise, when the magnetic field is steady, that is, a DC magnetic field, the free electron will have a circular trajectory of increasing radius since the magnetic force acting upon the free electron does not increase fast enough to counterbalance the centrifugal force which is proportional to the square of the tangential velocity.

For those electrons traveling in a direction parallel to the high-frequency magnetic field axis, (coaxial with the tube axis) their trajectory remains linear, but such electrons do not reach the tube wall. However, for those electrons whose instantaneous velocity is at an angle $\theta$ to the axes of both the high-frequency magnetic and electrostatic fields, their trajectory becomes a helix, the pitch and radius of such helix decreasing with increase in the angle $\theta$. This is illustrated in FIG. 8. The electron $e_1$ traveling at an angle $\theta$ relative to the axis of the magnetic field H follows a rather large helical path having an axis $x_1$, the angle $\theta$ being approximately 45°. The electron $e_2$, traveling in a direction normal to the field axis, also follows a helical path but of a smaller diameter and a very short pitch. The electron $e_0$, moving parallel to the field axis, has a linear path. It will be apparent that the electrons which move in helical paths (under the influence of the combined electromagnetic and electrostatic fields) have less possibility of reaching the wall of the tube, while being confined in a very small volume of the plasma, than those electrons which move in linear paths (as is the case without the presence of the electromagnetic field). Hence, the probabilities for effective elastic and inelastic electron-atom collisions are considerably increased. This explains, at least in part, the abnormal glow discharge, as observed. The described physical mechanism is wholly confirmed by the fact that the abnormal glow discharge cannot be excited when the ratio of the inside diameter of the tube (vessel) to the diameter of the surrounding excitation coil falls below a value of the order of 0.16 when the tube axis coincides with the coil axis. In such case, the high-frequency electrostatic field gradient, within the plasma, coincides with the magnetic field axis and the free electrons travel essentially in a linear path parallel to the tube axis. However, the abnormal glow discharge can again be brought about by moving the tube off the coil axis, that is, by placing the tube close to the coil winding. In such offcenter position of the tube, the axes of the high-frequency electrostatic and magnetic fields no longer coincide and the entrapment of the electrons in helical paths again occurs.

With the aid of these fundamental observations, I have designed a gas discharge laser which is capable of delivering a considerable amount of monochromatic, coherent light energy. By superimposing a high-frequency magnetic field upon a high-frequency electrostatic field, the electrons are confined within a smaller volume of the discharge plasma and the number of electrons captured by the walls of the tube is greatly reduced. Consequently, the light energy produced per watt input is far greater than in the case of a conventional gas laser excited only by means of an electrostatic field.

Figure 9:
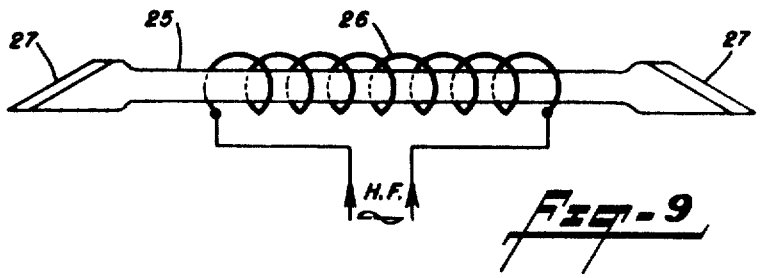
FIG. 9 illustrates a gas laser made in accordance with one embodiment of this invention.

FIG. 9 illustrates a gas laser made in accordance with one embodiment of this invention. The quartz tube 25 is disposed within the exciting coil 26, said coil having an axial length substantially equal to the active length of the tube. The tube ends are closed by the Brewster plates 27 and the gas pressure within the tube is somewhat less than 5 millimeters of mercury. Also, the ratio of the tube inside diameter to the coil diameter is made larger than 0.16. The coil 26 is connected to a high-frequency generator of suitable power capacity and constitutes a resonating tank coil (by reason of the distributed capacitance along the coil length) whose resonating frequency is matched with the generator frequency.

Figure 10:
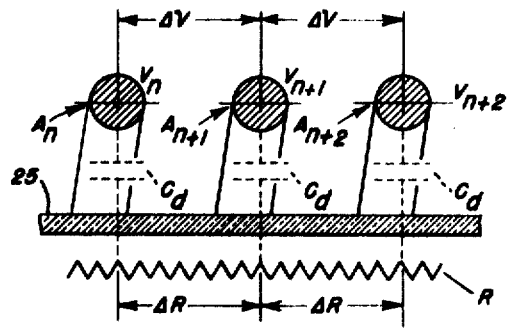
FIG. 10 is a fragmentary, cross-sectional presentation for developing the operating theory of a gas laser made in accordance with this invention.

Referring, now, to FIG. 10, which represents a part of the diametrical cross section of the system shown in FIG. 9, it will be noted that the consecutive coil convolutions $A_n$, $A_{n+1}$ and $A_{n+2}$ are at different instantaneous potentials, namely, $v_n$, $v_{n+1}$, $v_{n+2}$ creating high-frequency electrostatic fields among themselves. In consequence, the distributed capacitances represented by the dotted lined $C_d$, electrically couple the coil turns sections to the ohmic resistance R of the plasma. Thus, the elementary electrical circuit contains the distributed capacitances $C_d$ in series with only a portion of the plasma resistance ΔR of the total ohmic resistance R. The overall impedance of the circuit is considerably decreased and, for the same applied high-frequency voltage, a greater energy input into the gas electrical discharge is made possible.

Figure 11:
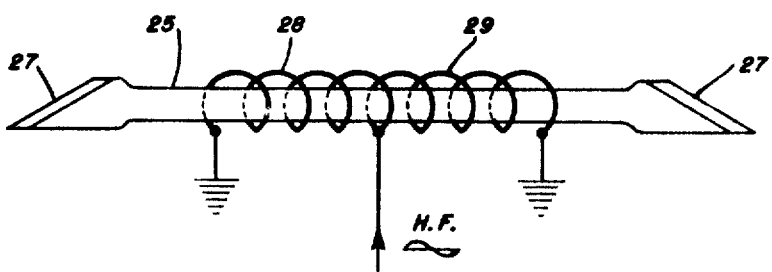

A modification of the exciting coil arrangement is illustrated in FIG. 11. Here, the coil comprises two winding sections 28, 29, with the center tap connected to the high-voltage point of the generator and the end terminals connected to a common ground return.

Another advantage of a laser made as shown in FIGS. 9 and 11 lies in the fact that the exciting coil, wound around the quartz tube, constitutes an effective electrostatic screen, isotropic with respect to the main axis of the tube. This eliminates the influence of electrostatic field distortion caused by any anisotropic distribution of the metal parts forming the general assembly, framework and the like. It is known that the smallest amount of distortion in axial symmetry of the general structure causes significant disturbances in the gas discharge.

In a practical sense, the high-frequency power input into the gas discharge is limited mostly by the output power characteristics of the high-frequency generator. Yet, the amount of power which can safely be injected into the gas plasma is of the order of kilowatts rather than watts. Hence, two fundamental precautions become mandatory as soon as the power input reaches a high value.

As a first precaution, the gas pressure must not exceed, under loading, a maximum of about 5 millimeters of mercury, otherwise the high-energy abnormal glow stops. In a sealed vessel, the pressure increases proportionally with the absolute stagnant temperature T of the gas. This is not to be confused with the electron-ion collision temperature which may exceed 10,000° K. Hence, for a limited range of power dissipation, the gas pressure P within the sealed laser tube must be adjusted, at room temperature, and in the absence of discharge, to a value given approximately by:

$$P \leq \frac{273°K + 20°K}{T_2} \times 5 \text{ mm. of mercury} \quad (7)$$

where $T_2$ represents the admissible absolute temperature under load.

Evidently, when the working temperature $T_2$ reaches some 800° C. (1,073° Kelvin) the initial pressure at room temperature becomes quite low.

$$P \leq \frac{293°K}{1073°K} \times 5 \text{ mm. of mercury} \quad (8)$$
$$= 1.36 \text{ mm. of mercury}$$

Therefore, as a second precaution, it is desirable to provide a cavity 30 (see FIG. 12) connected and sealed to the tube 25, in order to reduce the pressure variation due to the working temperature existing within the tube. Assuming, under load, a temperature $T_{c2}$ for the gas pressure in the auxiliary cavity 30 of volume $v_c$, and a temperature $T_2$ for the laser tube proper of volume $v_3$, the pressure $P_w$ in the assembly becomes;

$$P_w = P_1 \times \frac{T_{l_2}}{T_{l_1}} \times \frac{1 + \frac{v_e}{v_e} \times \frac{T_{c2}}{T_{c1}} \cdot \frac{T_{l_1}}{T_{l_2}}}{1 + \frac{v_e}{v_e}} \leq 5 \text{ mm. of mercury} \quad (9)$$

where
$P_1$ = pressure at room temperature ($T_{l_1}$),
$T_{l_1}$ = temperature of the gas in the laser tube without load,
$T_{l_2}$ = temperature of the gas in the laser tube under load,
$T_{c1}$ = temperature of the cavity without load,
$T_{c2}$ = temperature of the cavity under load,
$v_c$ = volume of the cavity, and
$v_e$ = volume of the laser tube.

The above relationship indicates that the working pressure $P_w$ decreases when the volume of the cavity $v_c$ increases.

The gain in pressure stability depends upon the gas temperature $T_{c2}$ within the cavity. By adequate cooling means, the ratio $T_{c2}/T_{c1}$ can be maintained close to unity.

Electing a volume ratio $\frac{v_e}{v_e} = \frac{2}{1}$, the final pressure, existing within the system, becomes, for the temperature already indicated:

$$P_w \cong P_1 \frac{T_{l_2}}{T_{l_1}} \times 0.52 \quad (10)$$

or, 52 percent of the pressure which would prevail without the auxiliary gas cavity. Obviously, auxiliary cavities of larger volume could be used to advantage.

Under maximum loading, the temperature ($T_{l_2}$) of the laser tube must not reach the material-softening point. Thus, when large input power is to be utilized, the tube should be cooled by forced convection. For this purpose, an air blast distributed along the length of the tube can be employed. With proper air velocities, a cooling effect of some 30 B.t.u. per square foot, per degree Fahrenheit, per hour, can be achieved. As shown in FIG. 13, adequate cooling can also be achieved by circulating water through a water jacket 31 enclosing the quartz tube 25. By this method, cooling rates of 600 B.t.u. per square foot, per degree Fahrenheit, per hour, are obtainable to maintain the temperature of the tube wall below 100° C. However, when very high discharge energies are necessary, it becomes more appropriate to secure the necessary cooling by means of condensing steam circulating at a high velocity within the water jacket 31. Cooling, by means of condensed steam, can provide a cooling rate of 4,000 B.t.u. per square foot, per degree Fahrenheit, per hour.

In order to enhance the stimulated radiation, the exciting coil can be made to present, to the tube wall, flat, light-reflecting surfaces. Such arrangement is shown in the fragmentary cross-sectional view of FIG. 14. Here, the coil 32 is formed of a conductor having a hemispherical cross section. The flat coil surface is parallel to the laser tube 25 and may be highly polished. Alternatively, the entire conductor may be coated with a good light-reflecting material.

The high-energy excitation of the gas laser by means of combined high-frequency magnetic and electrostatic fields offers still another advantage. The far greater amount of radiated light energy, produced per unit volume of the discharge plasma, makes it possible to shorten, considerably, the length of the laser tube, when the degree of collimation of the beam is not of prime importance. In this way, short gas lasers can be made to illuminate such measuring instruments as interferometers used in the measurement of lengths or, optical surface qualities, the normally observable fringe width being an extremely small fraction of the observable interferometer fringe separation and of extreme contrast ratio.

Also, the presence of the high-frequency magnetic field causes a certain percentage of the light, emitted parallel to the field axis, to be circularly polarized right and left, a highly desirable feature for physical studies and applications in birefringence measurement, dichroism, etc.

Having now described the invention, those skilled in this art will be able to make various changes and modifications in the illustrated and described assemblies in order to adapt the device to specific applications. It is intended that such changes and variations shall fall within the spirit and scope of the invention as recited in the following claims.

I claim:

1. A high-energy gas laser producing a continuous stable beam of coherent monochromatic light and wherein the glow of the gas mixture and the coherent light emission occur in a single vessel and the same gas mixture, said laser comprising, a. a tubular light-resonating cavity containing a gas mixture at a pressure of 1.0—5.5 millimeters of mercury,
b. an exciting coil encircling the cavity, the coil axis coinciding substantially with that of the cavity and the ratio of the cavity inside diameter to the coil diameter being at least 0.16,
c. a source of high-frequency voltage connected to the coil, the magnitude of the voltage applied to the coil being of the order of 400 volts per centimeter axial length of the coil, and
d. means for extracting light energy from the cavity.

2. The invention as recited in claim 1, wherein the frequency of the voltage is equal to the resonance frequency of the coil.

3. The invention as recited in claim 1, wherein the coil is made of a conductor having a hemispherical cross section with the flat surface thereof presented to the cavity, and wherein such flat surface has a good light-reflecting characteristic.

4. The invention as recited in claim 1, wherein the said light resonating cavity is sealed, and including an auxiliary cavity of fixed volume and communicating with the light-resonating cavity, the volume of said auxiliary cavity being at least equal to that of the light-resonating cavity.

5. The invention as recited in claim 1, including a vessel containing a supply of the gas mixture, means connected between the said vessel and one end of the light-resonating cavity for admitting the gas mixture into the said cavity, means for controlling the rate at which the gas mixture is admitted into the cavity, and means for removing the gas mixture from the other end of said cavity at a predetermined constant rate.